(12) United States Patent
Rampson et al.

(10) Patent No.: US 10,705,707 B2
(45) Date of Patent: *Jul. 7, 2020

(54) USER INTERFACE FOR EDITING A VALUE IN PLACE

(71) Applicant: Microsoft Technology Licensing, LLC, Redmond, WA (US)

(72) Inventors: Benjamin Edward Rampson, Woodinville, WA (US); Karen Xiaoxu Cheng, Seattle, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/162,108

(22) Filed: Oct. 16, 2018

(65) Prior Publication Data

US 2019/0050141 A1 Feb. 14, 2019

Related U.S. Application Data

(63) Continuation of application No. 15/487,852, filed on Apr. 14, 2017, now Pat. No. 10,133,466, which is a
(Continued)

(51) Int. Cl.
| | |
|---|---|
| *G06F 3/041* | (2006.01) |
| *G06F 3/0484* | (2013.01) |
| *G06F 3/0488* | (2013.01) |

(52) U.S. Cl.
CPC ........ *G06F 3/04847* (2013.01); *G06F 3/0488* (2013.01); *G06F 3/04883* (2013.01)

(58) Field of Classification Search
USPC .... 345/173, 636, 545, 473, 581, 440.2, 626, 345/163, 472, 428, 184, 660; 715/770,
(Continued)

(56) References Cited

U.S. PATENT DOCUMENTS

| | | | | |
|---|---|---|---|---|
| 5,717,939 A | * | 2/1998 | Bricklin | ................ G06F 17/211 |
| | | | | 345/173 |
| 2007/0115289 A1 | * | 5/2007 | Goldfarb | ................ G06T 13/40 |
| | | | | 345/473 |

(Continued)

OTHER PUBLICATIONS

"Office Action Issued in European Patent Application No. 12833446.3", dated Jan. 16, 2019, 5 Pages.
(Continued)

*Primary Examiner* — Thuy N Pardo
(74) *Attorney, Agent, or Firm* — Shook, Hardy & Bacon, LLP (57) ABSTRACT

A user interface element is displayed for in place editing of values within a document. For example, in response to selecting a value, a user interface is displayed near the value that receives a slide gesture for adjusting the value in place. The user interface may be configured to select one of the discrete parts of the value in response to changing a level of the slide gesture. For example, a user may move the swipe gesture from a level used for adjusting the day value to the level representing the year value. The user interface displayed and method(s) used to adjust the value may be based on the type of value and the structure and content of the document.

21 Claims, 8 Drawing Sheets

Related U.S. Application Data continuation of application No. 13/240,547, filed on Sep. 22, 2011, now Pat. No. 9,720,583.

(58) Field of Classification Search
USPC .................................................. 715/723, 716
See application file for complete search history.

(56) References Cited

U.S. PATENT DOCUMENTS

| | | | | |
|---|---|---|---|---|
| 2008/0049039 A1* | 2/2008 | Berrill | ................. | G06F 3/04855 345/581 |
| 2009/0231361 A1* | 9/2009 | Schieltz | ............. | G06F 17/2223 345/636 |
| 2010/0033486 A1* | 2/2010 | Dahlen | ................. | G06T 11/206 345/440.2 |
| 2010/0053211 A1* | 3/2010 | Ingermanson | ....... | G06K 9/0014 345/626 |
| 2010/0060607 A1* | 3/2010 | Ludwig | ................. | G06F 3/0346 345/173 |
| 2010/0064238 A1* | 3/2010 | Ludwig | ................. | G06F 3/0346 715/770 |
| 2010/0281380 A1* | 11/2010 | Langmacher | ....... | G06F 3/04847 715/723 |
| 2011/0080351 A1* | 4/2011 | Wikkerink | .......... | G06F 3/04883 345/173 |
| 2011/0134039 A1* | 6/2011 | Ludwig | ................. | G06F 3/0346 345/163 |
| 2011/0273464 A1* | 11/2011 | Brunner | ................. | G06T 13/00 345/545 |
| 2013/0097502 A1* | 4/2013 | Langmacher | ....... | G06F 3/04847 715/716 |
| 2015/0062014 A1* | 3/2015 | Ludwig | ................. | G06F 3/0346 345/163 |
| 2018/0164941 A1* | 6/2018 | Homma | ............. | G06F 3/04847 345/173 |

OTHER PUBLICATIONS

"Office Action Issued in Korean Patent Application No. 1020147007393", dated Jan. 21, 2019, 5 Pages.

"Office Action Issued in Canadian Patent Application No. 2848407", dated Feb. 18, 2019, 3 Pages.

"Oral Hearing Issued in European Patent Application No. 12833446. 3", Mailed Date: Jun. 21, 2019, 6 Pages.

"Office Action Issued in Canadian Patent Application No. 2848407", dated Nov. 13, 2019, 3 Pages.

"Office Action Issued in Brazilian Patent Application No. BR1120140064032", dated Dec. 4, 2019, 5 Pages.

"Office Action Issued in Indian Patent Application No. 2052/CHENP/2014", dated Jan. 17, 2020, 7 Pages.

* cited by examiner

USER INTERFACE FOR EDITING A VALUE IN PLACE

CROSS-REFERENCE

The present application is a continuation of and claims priority to U.S. patent application Ser. No. 15/487,852, filed Apr. 14, 2017, entitled USER INTERFACE FOR EDITING A VALUE IN PLACE, which is a continuation of U.S. patent application Ser. No. 13/240,547, filed Sep. 22, 2011, entitled USER INTERFACE FOR EDITING A VALUE IN PLACE, the disclosures of each of which are hereby incorporated in their entirety by reference.

BACKGROUND

When working on many mobile computing devices (e.g. smart phone, tablet) the screen real estate and input devices available are often limited making editing of displayed content challenging for many users. For example, not only is the display limited in size, many devices use a Software-based Input Panel (SIP) in place of a physical keyboard. The display of the SIP can use a large amount of the limited screen space leaving little space available to show information that is associated with an application on the computing device.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

A user interface element is displayed for in place editing of values within a document. For example, in response to selecting a value, a user interface is displayed near the value that receives a slide gesture for adjusting the value in place. The user interface may be configured to select one of the discrete parts of the value in response to changing a level of the slide gesture. For example, a user may move the swipe gesture from a level used for adjusting the day value to the level representing the year value. The user interface displayed and method(s) used to adjust the value may be based on the type of value and the structure and content of the document.

DETAILED DESCRIPTION

Referring now to the drawings, in which like numerals represent like elements, various embodiment will be described. In particular, FIG. 1 and the corresponding discussion are intended to provide a brief, general description of a suitable computing environment in which embodiments may be implemented.

Generally, program modules include routines, programs, components, data structures, and other types of structures that perform particular tasks or implement particular abstract data types. Other computer system configurations may also be used, including hand-held devices, multiprocessor systems, microprocessor-based or programmable consumer electronics, minicomputers, mainframe computers, and the like. Distributed computing environments may also be used where tasks are performed by remote processing devices that are linked through a communications network. In a distributed computing environment, program modules may be located in both local and remote memory storage devices.

Figure 1:
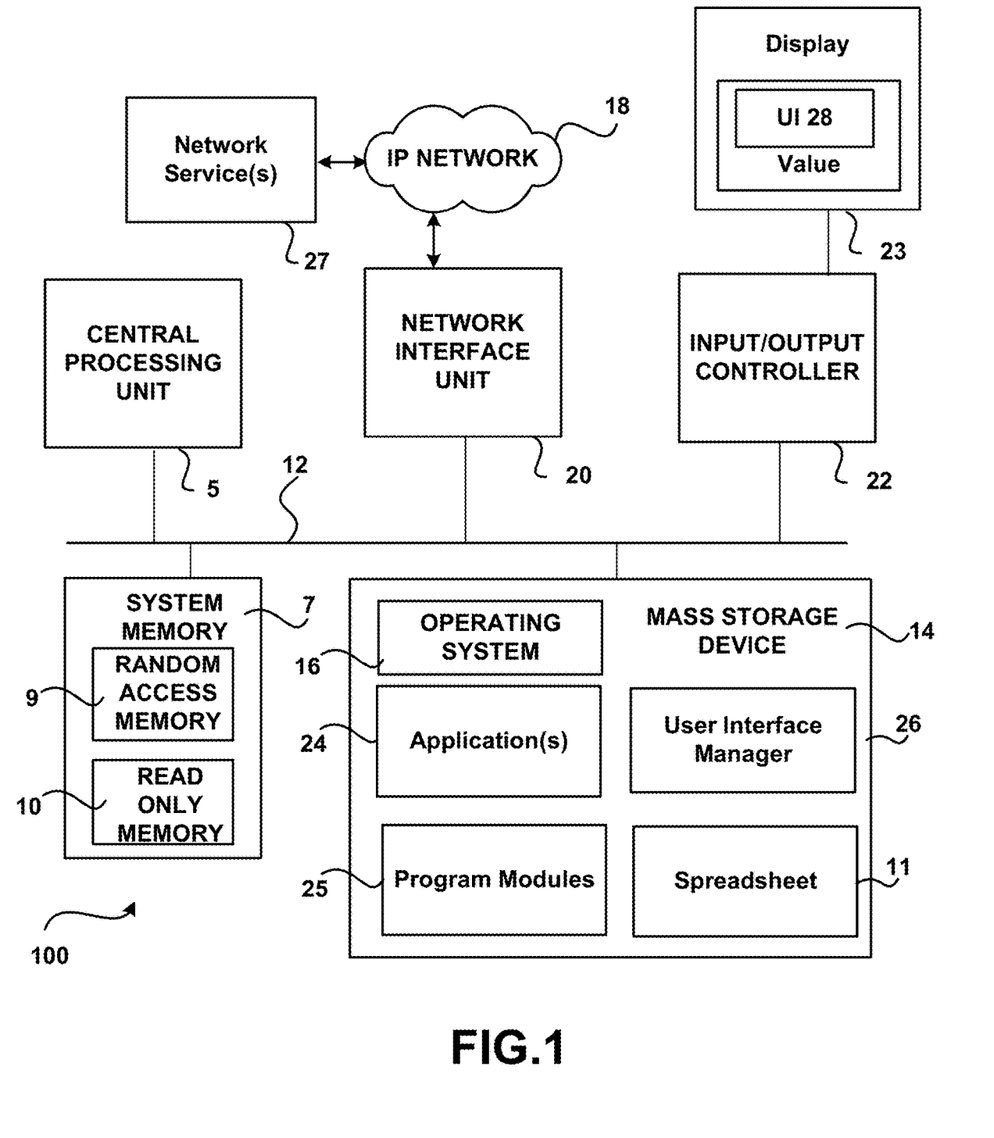
FIG. 1 illustrates an exemplary computing environment.

Referring now to FIG. 1, an illustrative computer environment for a computer 100 utilized in the various embodiments will be described. The computer environment shown in FIG. 1 includes computing devices that each may be configured as a mobile computing device (e.g. phone, tablet, netbook, laptop), server, a desktop, or some other type of computing device and includes a central processing unit 5 ("CPU"), a system memory 7, including a random access memory 9 ("RAM") and a read-only memory ("ROM") 10, and a system bus 12 that couples the memory to the central processing unit ("CPU") 5.

A basic input/output system containing the basic routines that help to transfer information between elements within the computer, such as during startup, is stored in the ROM 10. The computer 100 further includes a mass storage device 14 for storing an operating system 16, application(s) 24 (e.g. productivity application, Web Browser, and the like) and user interface manager 26 which will be described in greater detail below.

The mass storage device 14 is connected to the CPU 5 through a mass storage controller (not shown) connected to the bus 12. The mass storage device 14 and its associated computer-readable media provide non-volatile storage for the computer 100. Although the description of computer-readable media contained herein refers to a mass storage device, such as a hard disk or CD-ROM drive, the computer-readable media can be any available media that can be accessed by the computer 100.

By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, Erasable Programmable Read Only Memory ("EPROM"), Electrically Erasable Programmable Read Only Memory ("EEPROM"), flash memory or other solid state memory technology, CD-ROM, digital versatile disks ("DVD"), or other optical storage, magnetic cassettes, magnetic tape, magnetic disk storage or other magnetic storage devices, or any other medium which can be used to store the desired information and which can be accessed by the computer 100.

Computer 100 operates in a networked environment using logical connections to remote computers through a network 18, such as the Internet. The computer 100 may connect to the network 18 through a network interface unit 20 connected to the bus 12. The network connection may be wireless and/or wired. The network interface unit 20 may also be utilized to connect to other types of networks and remote computer systems. The computer 100 may also include an input/output controller 22 for receiving and processing input from a number of other devices, including a keyboard, mouse, a touch input device, or electronic stylus (not shown in FIG. 1). Similarly, an input/output controller 22 may provide input/output to a display screen 23, a printer, or other type of output device.

A touch input device may utilize any technology that allows single/multi-touch input to be recognized (touching/non-touching). For example, the technologies may include, but are not limited to: heat, finger pressure, high capture rate cameras, infrared light, optic capture, tuned electromagnetic induction, ultrasonic receivers, transducer microphones, laser rangefinders, shadow capture, and the like. According to an embodiment, the touch input device may be configured to detect near-touches (i.e. within some distance of the touch input device but not physically touching the touch input device). The touch input device may also act as a display. The input/output controller 22 may also provide output to one or more display screens 23, a printer, or other type of input/output device.

A camera and/or some other sensing device may be operative to record one or more users and capture motions and/or gestures made by users of a computing device. Sensing device may be further operative to capture spoken words, such as by a microphone and/or capture other inputs from a user such as by a keyboard and/or mouse (not pictured). The sensing device may comprise any motion detection device capable of detecting the movement of a user. For example, a camera may comprise a MICROSOFT KINECT® motion capture device comprising a plurality of cameras and a plurality of microphones.

Embodiments of the invention may be practiced via a system-on-a-chip (SOC) where each or many of the components/processes illustrated in the FIGURES may be integrated onto a single integrated circuit. Such a SOC device may include one or more processing units, graphics units, communications units, system virtualization units and various application functionality all of which are integrated (or "burned") onto the chip substrate as a single integrated circuit. When operating via a SOC, all/some of the functionality, described herein, with respect to the Unified Communications via application-specific logic integrated with other components of the computing device/system 100 on the single integrated circuit (chip).

As mentioned briefly above, a number of program modules and data files may be stored in the mass storage device 14 and RAM 9 of the computer 100, including an operating system 16 suitable for controlling the operation of a computer, such as the WINDOWS PHONE 7®, WINDOWS 7®, or WINDOWS SERVER® operating system from MICROSOFT CORPORATION of Redmond, Wash. The mass storage device 14 and RAM 9 may also store one or more program modules. In particular, the mass storage device 14 and the RAM 9 may store one or more application programs, such as a spreadsheet application, word processing application and/or other applications. According to an embodiment, the MICROSOFT OFFICE suite of applications is included. The application(s) may be client based and/or web based. For example, a network service 27 may be used, such as: MICROSOFT WINDOWS LIVE, MICROSOFT OFFICE 365 or some other network based service.

User interface manager 26 is configured to present a user interface element (e.g. UI 28) to edit/adjust a value in place. User interface manager 26 may be located externally from an application, e.g. a spreadsheet application or some other application, as shown or may be a part of an application. Further, all/some of the functionality provided by user interface manager 26 may be located internally/externally from an application for which the user interface element is used for editing value(s) in place. More details regarding the user interface manager are disclosed below.

Figure 2:
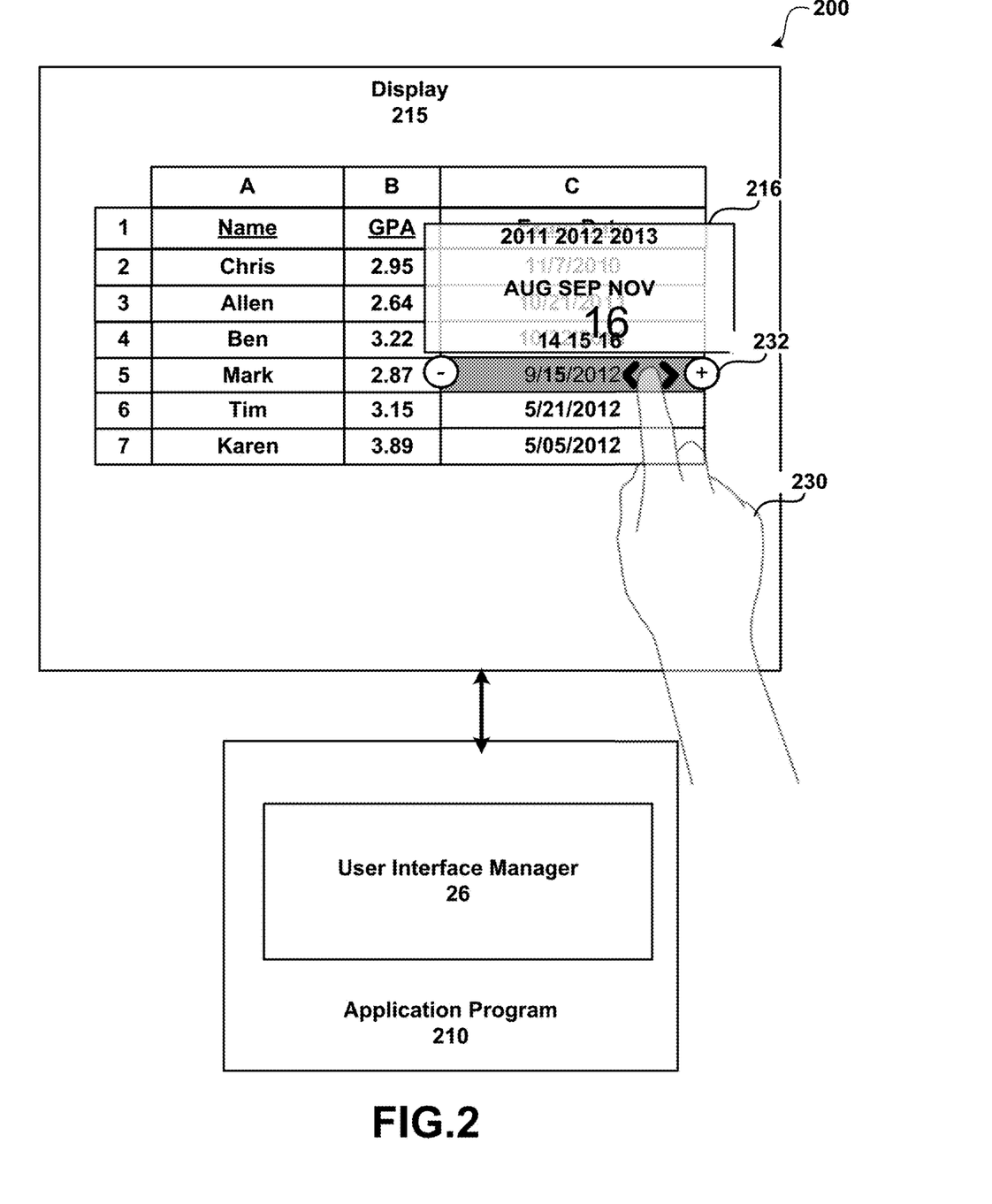
FIG. 2 shows a system including the use of a user interface for the in place editing of values.

FIG. 2 shows a system including the use of a user interface for the in place editing of values. As illustrated, system 200 includes application program 210, user interface (UI) manager 26 and touch screen input device/display 215.

In order to facilitate communication with the UI manager 26, one or more callback routines, may be implemented. According to one embodiment, application program 210 is a business productivity application that is configured to receive input from a touch-sensitive input device 215 and/or keyboard input (e.g. a physical keyboard and/or SIP). For example, UI manager 26 may provide information to application 210 in response to a user's gesture (i.e. finger on hand 230) selecting a value and performing a swipe gesture on user interface element 216 to adjust the selected value. The term "swipe gesture" may include a swiping action and/or dragging action.

System 200 as illustrated comprises a touch screen input device/display 215 that detects when a touch input has been received (e.g. a finger touching or nearly teaching the touch screen). Any type of touch screen may be utilized that detects a user's touch input. For example, the touch screen may include one or more layers of capacitive material that detects the touch input. Other sensors may be used in addition to or in place of the capacitive material. For example, Infrared (IR) sensors may be used. According to an embodiment, the touch screen is configured to detect objects that in contact with or above a touchable surface. Although the term "above" is used in this description, it should be understood that the orientation of the touch panel system is irrelevant. The term "above" is intended to be applicable to all such orientations. The touch screen may be configured to determine locations of where touch input is received (e.g. a starting point, intermediate points and an ending point). Actual contact between the touchable surface and the object may be detected by any suitable means, including, for example, by a vibration sensor or microphone coupled to the touch panel. A non-exhaustive list of examples for sensors to detect contact includes pressure-based mechanisms, micro-machined accelerometers, piezoelectric devices, capacitive sensors, resistive sensors, inductive sensors, laser vibrometers, and LED vibrometers.

UI manager 26 is configured to display UI element for in place editing of a selected value and process the received input device/display 202. A user interface element 216 is displayed for in place editing of values in response to a value being selected. For example, in response to selecting spreadsheet cell 232 that includes a date value, UI element 216 is displayed near the value that receives a slide gesture for adjusting the value in place. As illustrated, the selected cell is distinguished from the other cells by changing a fill color of the cell and selecting the part of the value that is currently being edited/adjusted. Other methods may be used to distinguish the selected cell (e.g. border around cell, different fill pattern, changing a display of the value, and the like). In the current example, a user may tap on the "+" or "−" indicator to change the value in addition to performing the swipe gesture. The user interface displays a different level for each of the discrete parts of the date value. As illustrated the user has performed a swipe gesture on the first level that currently shows a change in the "15" to "16". When the user ends the swipe gesture, the value within the cell is set to the currently selected value. The value in the cell may also update in real time as the swipe gesture is being performed. To change the year value or the month value within the date value, the user moves the swipe gesture from the day level to the desired level. The user interface displayed and method (s) used to adjust the value may be based on the type of value and the structure and content of the document. For example, the content of the cells near the selected cell may be used to determine the type of value, a predicted value, and the like.

Figure 3:
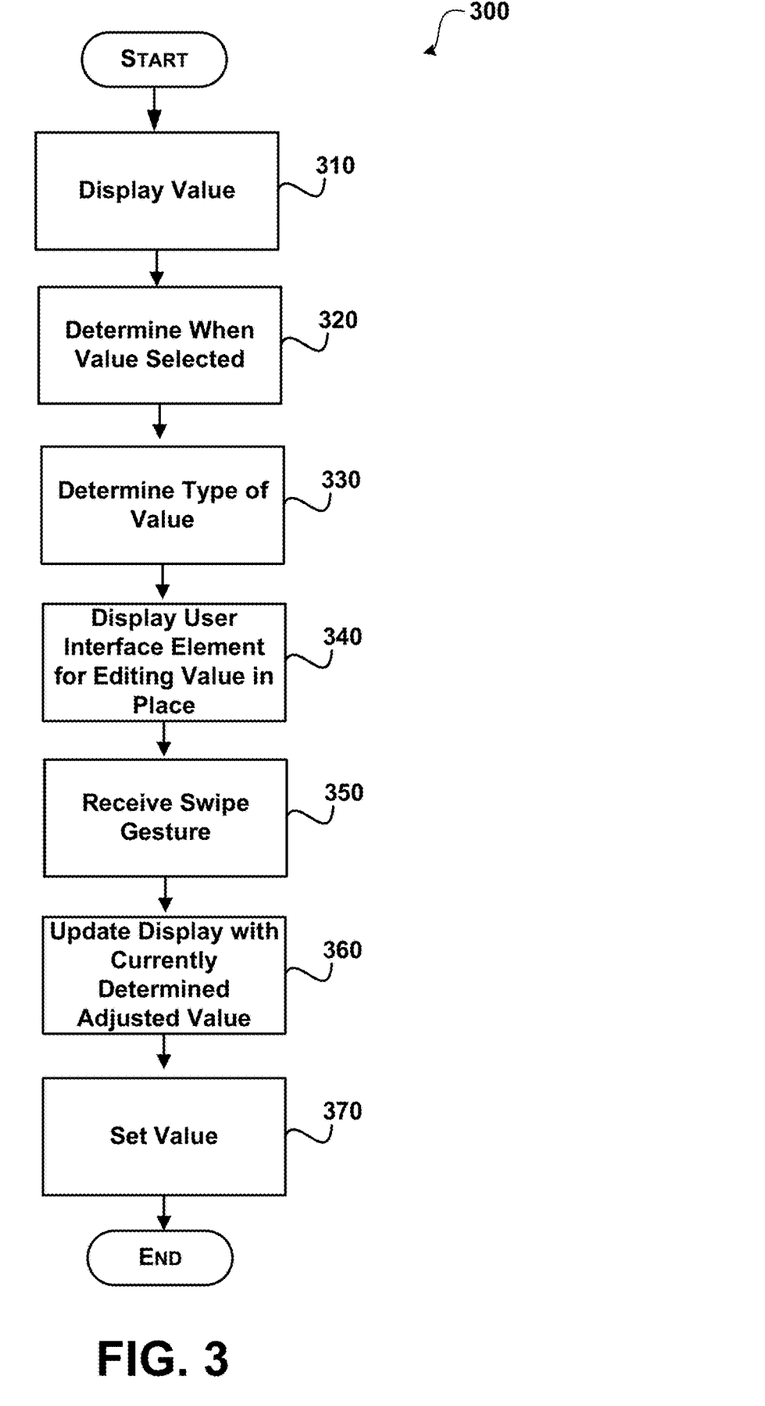
FIG. 3 shows a process for selecting and adjusting a value in place using a user interface element.
Figure 4:
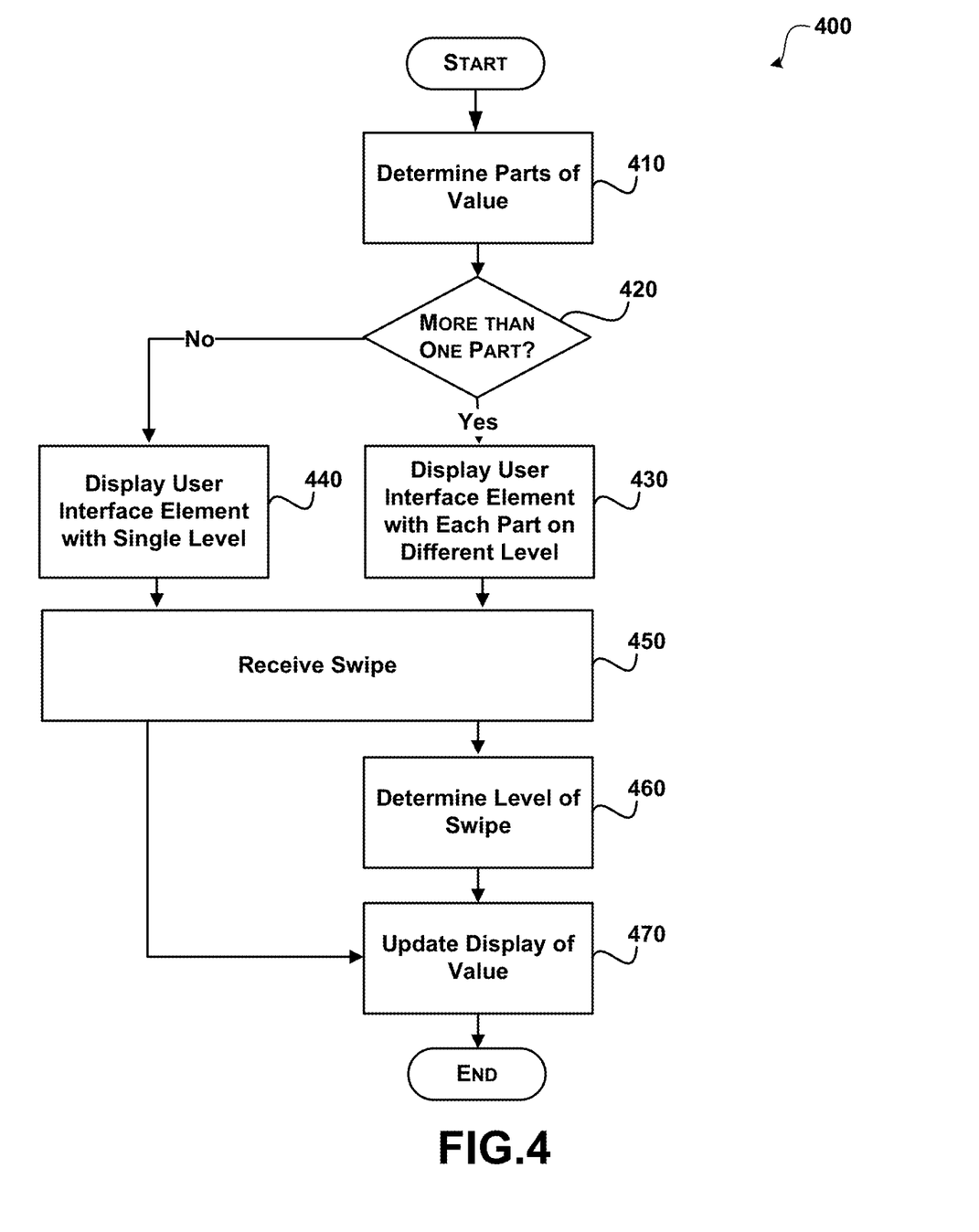
FIG. 4 shows a process for selecting and adjusting different parts of a value.

FIGS. 3 and 4 show illustrative processes for displaying and interacting with a user interface element for editing a value in place. When reading the discussion of the routines presented herein, it should be appreciated that the logical operations of various embodiments are implemented (1) as a sequence of computer implemented acts or program modules running on a computing system and/or (2) as interconnected machine logic circuits or circuit modules within the computing system. The implementation is a matter of choice dependent on the performance requirements of the computing system implementing the invention. Accordingly, the logical operations illustrated and making up the embodiments described herein are referred to variously as operations, structural devices, acts or modules. These operations, structural devices, acts and modules may be implemented in software, in firmware, in special purpose digital logic, and any combination thereof.

FIG. 3 shows a process for selecting and adjusting a value in place using a user interface element.

After a start block, process 300 moves to operation 310, where a value is displayed within a graphical window. The value may associated with one or more applications. For example, the application may be an office productivity application (e.g. spreadsheet, word-processing, presentation, . . . ) or some other type of application. The value may be displayed within a document and/or within a user interface used for setting values. According to an embodiment, the value(s) to be adjusted are displayed in a document such as a spreadsheet, a word processing document, a table and the like.

Flowing to operation 320, a determination is made as to when a value is selected for editing. A value may be selected using various methods. For example, a user may select a cell by: tapping on a value/cell/user interface option, moving a pointer (e.g. mouse, pen) over a value/cell/user interface option moving a pointer (e.g. mouse, pen) over a value/cell/user interface option and clicking, and the like.

Moving to operation 330, a determination is made as to what type of value is selected. The value may contain a single part or more than one part (e.g. date, social security number, complex number, . . . ). The type of value may be a numerical value or a discrete value that is selected from a set of values. For example, the value may be a day, month, type of item, a value selected from a row/column, and the like. The type of value may be determined from the type of value that is allowed by the cell/location/field within the document/table and/or determined from content around the selected value. For example, one or more cells within a spreadsheet may be examined to determine the type of values within the cells near the selected cells (e.g. it may be determined that the selected cell even though it is currently empty should contain a date that is near the current year "2011"). Generally, the type of value may be any type of value that is displayed near the selected value. For example, the values may come from the same row/column of the selected value.

Transitioning to operation 340, a user interface element for editing a value in place is displayed. The UI element may be displayed in response to the selection, the action that indicates the cell/value/field is to be edited (e.g. generic edit action) and/or through some other UI to launch the UI element, and the like. The UI element is displayed near the display of the value such that input to adjust the value is received near the display of the value. According to an embodiment, the UI element comprises a display of a line that extends outward from each side of the value (See FIG. 8). According to another embodiment, the UI appears near a display of the value and includes a displayed level for each part of the value (See FIGS. 5-7). According to an embodiment, the UI element is alpha blended such that content displayed under the UI element remains visible.

Flowing to operation 350, a swipe gesture is received to adjust the value. The swipe gesture may be a touch input and/or an input received using another input device (e.g. mouse). According to an embodiment, the swipe gesture is a touch input that detects a swipe of a finger (e.g. horizontal/vertical movement that moves from a starting point to an ending point). The swipe gesture may adjust the value at different speeds depending on the location of the swipe from the selected value. For example, if the swipe is near the value, the value may be incremented by a single value whereas when the swipe is farther away, the value may be incremented by a multiplier (e.g. two, four, ten) depending on the distance from the value. The range of potential values may also be used to determine the speed of adjustment. For example, when the range of value is small (e.g. one to ten) the adjustment of the value may be slower. When the range of the value is larger (e.g. one thousand to one hundred thousand) the adjustment of the value may be faster and/or the multiplier may be larger). The same swipe gesture may be used to set one or more parts of the value. For example, a user may place their finger down on the UI element, move to the first level and move left/right to set a value within the first level, and then move up to another level without lifting their finger and then move left/right to set the value for that level. According to an embodiment, a user may continue to adjust different parts of the value by moving to different levels and selecting a value for that level as long as the same swipe gesture (e.g. fingertip remains down on the display) is detected.

Moving to operation 360, the display is updated with the adjusted value. The display of the value may be updated during the time the swipe gesture is being received and/or after the swipe gesture is complete. For example, while a user is performing the swipe gesture, the value may be shown as changing. According to an embodiment, a display of the UI element is updated to reflect a current adjusted value without updating the display of the selected value.

Transitioning to operation 370, the adjusted value is set when the swipe gesture is ended (e.g. the user removes their finger from the display or the user unselects the value using some other input method).

The process then flows to an end block and returns to processing other actions.

FIG. 4 shows a process for selecting and adjusting different parts of a value.

After a start block, process 400 moves to operation 410, where the different parts of a value are determined. The value may contain one or more parts. For example, an integer value contains one part, whereas a date value and social security value each contain three different parts. Generally, a part of a value may be adjusted independently from the other part(s) of the value. A value may also be separated into parts based on significant digits. Other divisions of the value into parts may also be determined. For example, a first part of the value may be the ones column, a second part may be the tens column, a third part may be the hundreds column, and the like.

Flowing to decision operation 420, a determination is made as whether the value has more than one part.

When the value does have more than one part, the process flows to operation 430, where a UI element is displayed that includes a display for each part on a different level of the display of the UI element.

When the value does not have more than one part, the process flows to operation 440 where the UI element is displayed with a single level display.

Moving to operation 450 from either operation 430 or operation 440, the swipe gesture is received.

Transitioning to operation 460, a determination is made as to what level the swipe was made. For example, a swipe at one level adjusts a part of the value that is associated with that level. As discussed above, more than one part of a value may be set using the same swipe gesture.

Flowing to operation 470, the display of the value is updated in response to the swipe gesture.

The process then flows to an end block and returns to processing other actions.

FIGS. 5-8 show exemplary windows for adjusting a value in place using a UI displayed in response to selecting a value. FIGS. 5-8 are for exemplary purpose and are not intended to be limiting.

Figure 5:
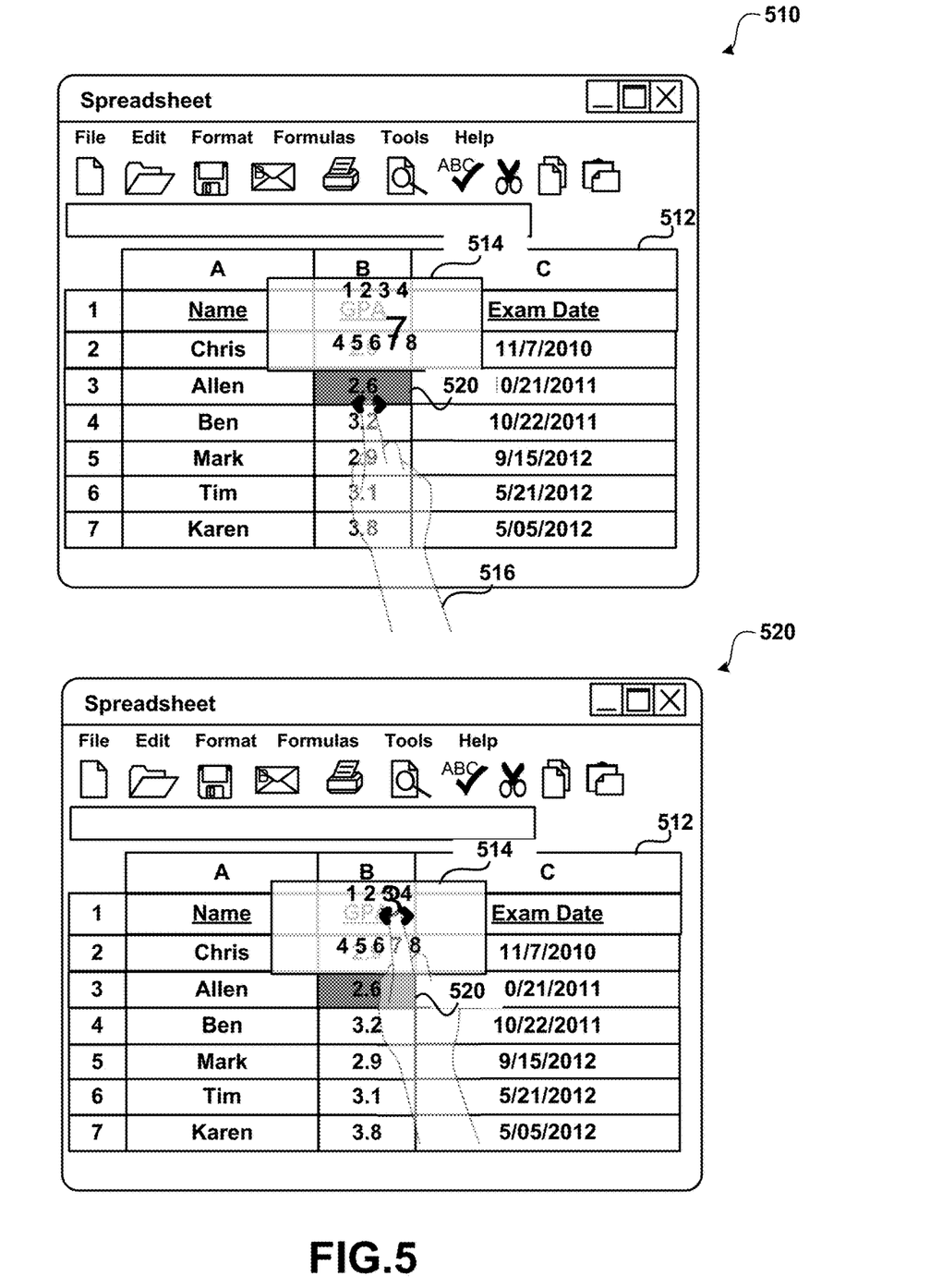
FIG. 5 shows displays for adjusting a value in place within a spreadsheet.

FIG. 5 shows displays for adjusting a value in place within a spreadsheet. As illustrated, window 510 and window 520 each display a spreadsheet 512 that shows a name column, a GPA column, and an exam date column in which a user has selected cell 520 for adjusting the current value "2.6" in place using a UI element. More or fewer columns/areas that include values may be included within windows 510 and 520. A window may be a window that is associated with a desktop application, a mobile application and/or a web-based application (e.g. displayed by a browser). The window may be displayed on a limited display device (e.g. smart phone, tablet) or on a larger screen device.

As illustrated, selected cell 520 is displayed differently from the other cells of the spreadsheet to indicate to a user that the cell is currently selected. While cell 520 is shown as being highlighted, other display options may be used to indicate the cell is selected (e.g. border around cell, hashing, color changes, font changes and the like).

In response to determining to edit cell 520 (e.g. selection, edit action, selection of another UI element . . . ), UI element 514 is displayed. In the current example, two levels are displayed within UI element 514 since the GPA value comprises two parts. According to an embodiment, a default part of the value is selected to be adjusted. For example, the second part of the GPA value is selected by default to be part of the value that is displayed on the first level. Referring to UI element 514, the first level shows the values 4, 5, 6, 7 and 8 and the second level shows the values 1, 2 and 3. More or fewer potential values may be displayed on each level. For example, the second level for a GPA value could show all of the potential values (0-4). In the current example, the user has selected cell 520 by tapping the cell and then has dragged their finger to the right to select "7" as the adjusted value. In response to the swipe gesture, a graphical indicator is used within UI element 514 to show the currently adjusted value. In the example, the current value based on the current swipe gesture is shown larger. Other methods of indicating a current value may also be shown (e.g. changing font, placing a border around the value, changing a color of the value, and the like). When the user ends the swipe gesture (e.g. removing their finger from the display, releasing a mouse button, . . . ) the value is adjusted in the cell. If the user were to release at the current point in the example, 2.6 would be replaced with 2.7. A user could move further to the right/left in the UI element 514 to select a value that in not initially shown. For example, when the user moves on the first level past the "7" value or some other determined value, additional values may be shown within the UI element 514 (e.g. 9, 10 . . . ). Similarly, when the user moves to the left, lower values may be shown within the UI element 514 (e.g. 3, 2, 1).

Window 520 shows the user adjusting the second part of the value for the GPA. To select the second level, the user has moved to the second level and has moved to the right that selects the 3 value for the GPA.

According to an embodiment, the contents of the cell and the surrounding cells (in this case the GPA column) are used to assist in determining potential values that may be included within a cell. This information may be used in determining how many levels/potential values to display within the UI element. As shown, UI element 514 is displayed alpha blended, such that a portion of the content below the UI element can still be seen. The UI element 514 may also be shown using different methods (e.g. no alpha blending, different colors . . . ). The UI element 514 may be displayed in different locations. For example, UI element 514 could be shown to the left, right and/or over the display of the selected cell.

Figure 6:
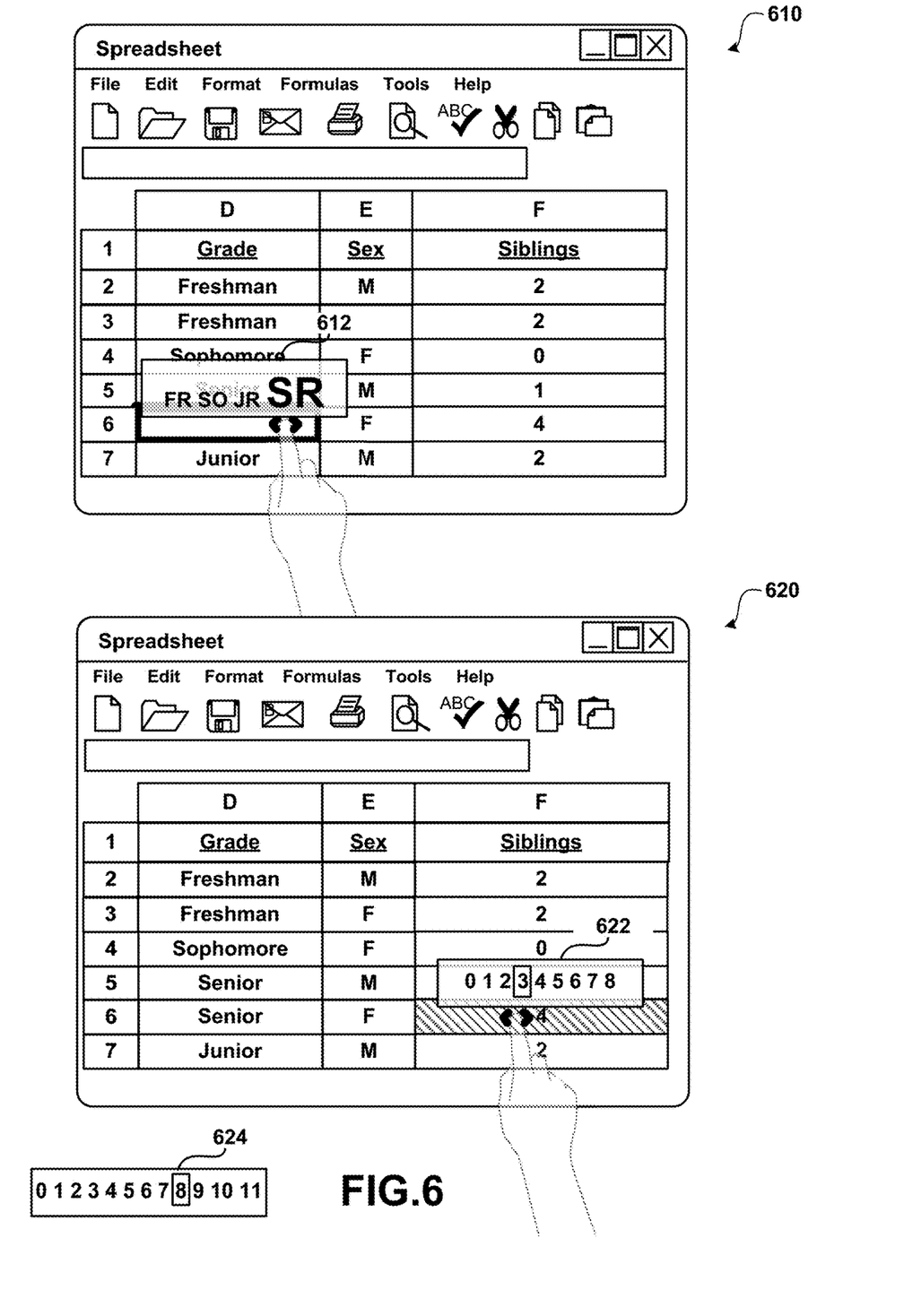
FIG. 6 shows displays for adjusting a value in place within a spreadsheet.

FIG. 6 shows displays for adjusting a value in place within a spreadsheet. As illustrated, window 610 and window 620 each include a spreadsheet that currently shows a Grade column, a sex column, and a siblings column. In the current example, the grade column may comprise a value that is selected from freshman (FR), sophomore (SO), junior (JR) and senior (SR). The sex column may comprise a male (M) value or a female (F) value. The siblings column may comprise a value that starts at 0 and goes up.

Window 610 shows a user selecting cell D6 that is indicated to be selected by displaying a thicker border around the cell. In response to the selection, UI element 612 is displayed that shows four potential different values that can be selected for the grade value. Fewer potential values could be shown in UI element 612 (e.g. one, two, three). In the current example, the user has performed a swipe gesture to currently select the blank cell D6 that is shown larger within UI element 612. In response to ending the swipe gesture, cell D6 is updated to "Senior" as can be seen in window 620. Before selection, cell D6 may/may not contain a value.

Window 620 shows a user selecting cell F6 that is indicated to be selected by displaying a fill within the cell. In response to the selection, UI element 622 is displayed that shows potential values that can be selected for the siblings value. In the current example, the user has performed a swipe gesture to currently select the value 3 (shown within a border) for cell D6. As discussed above, if the user moves beyond/near the end of the initially displayed values within the UI element more values may be shown. For example, UI element 624 may be displayed when a user moves to near the end or at the end of the initially displayed values. As illustrated, values 9, 10, and 11 are displayed when the user moves to the "8" value within UI element 622.

Figure 7:
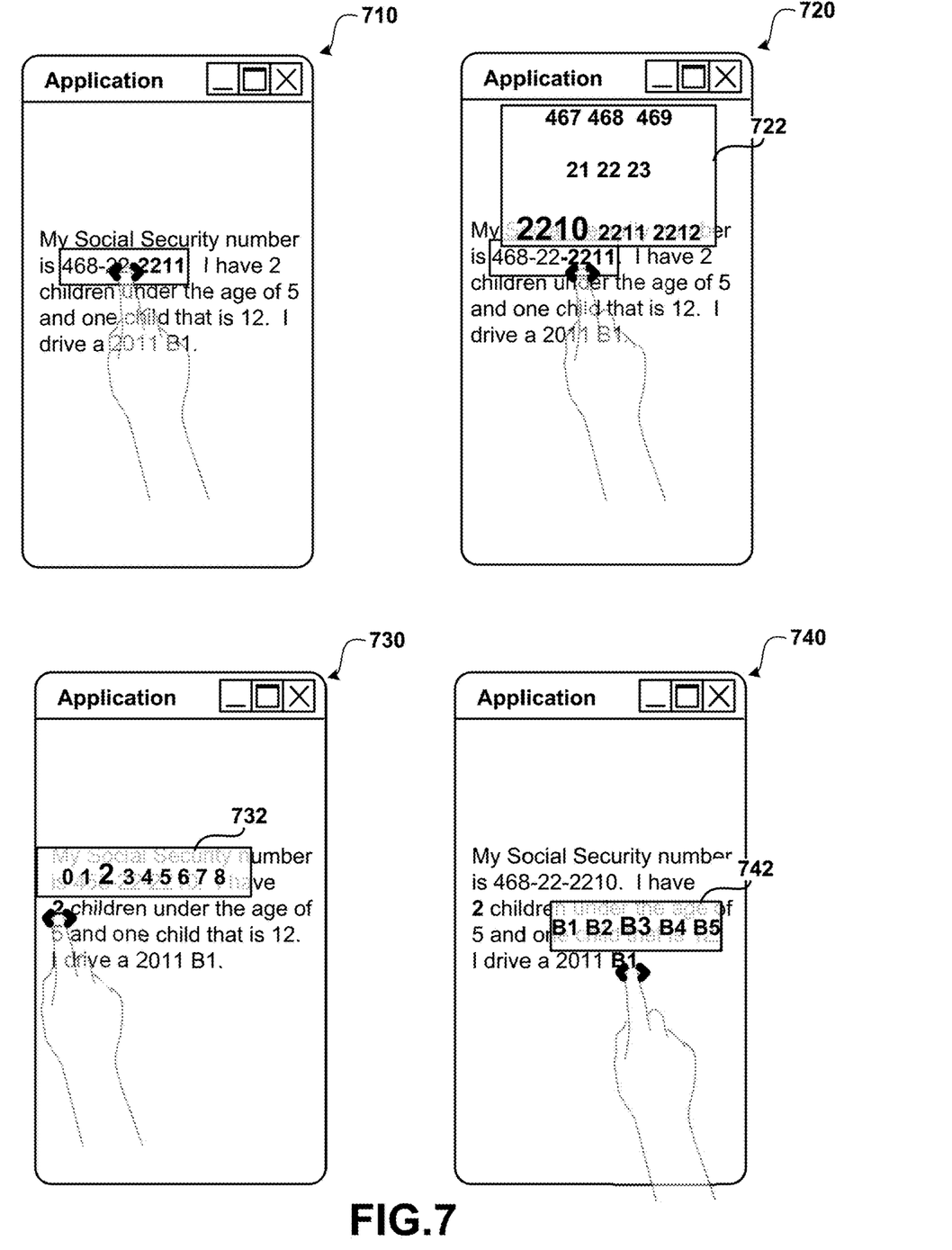
FIG. 7 shows displays for adjusting a value in place within a document.

FIG. 7 shows displays for adjusting a value in place within a document. As illustrated, window 710, window 720, window 730 and window 740 each include a display of a document that includes values that may be selected for changing the value in place.

Window 710 shows a user selecting a social security number within the document. According to an embodiment, any discrete value within a document may be selected.

Window 720 shows UI element 722 displayed in response to the selection of the social security number. As illustrated, UI element 722 includes a display level of potential values for each part of the social security number. The value may divided into different parts. For example, a level may be displayed for each digit of the number, or different chunks of the value (ex. the 2211 part of the displayed value could be shown as two different levels, each with 2 digits). In the current example, the third part of the social security number is shown highlighted to indicate that the third part is the currently selected part of the value for receiving adjustments. The value 2210 is selected by the user moving the swipe gesture to the left. Moving farther left causes the UI element 722 to adjust the display of the potential values (e.g. 2209, 2208, 2207 . . . ). The user may select a different level by moving the swipe gesture to the desired level.

Window 730 shows a user selecting an integer value 2 in the document. In response to selecting the integer value UI element 732 is displayed with potential values for selection.

Window 740 shows a user selecting the B1 brand value. For example, the value may be a type of car that comprises a limited number of potential values.

Figure 8:
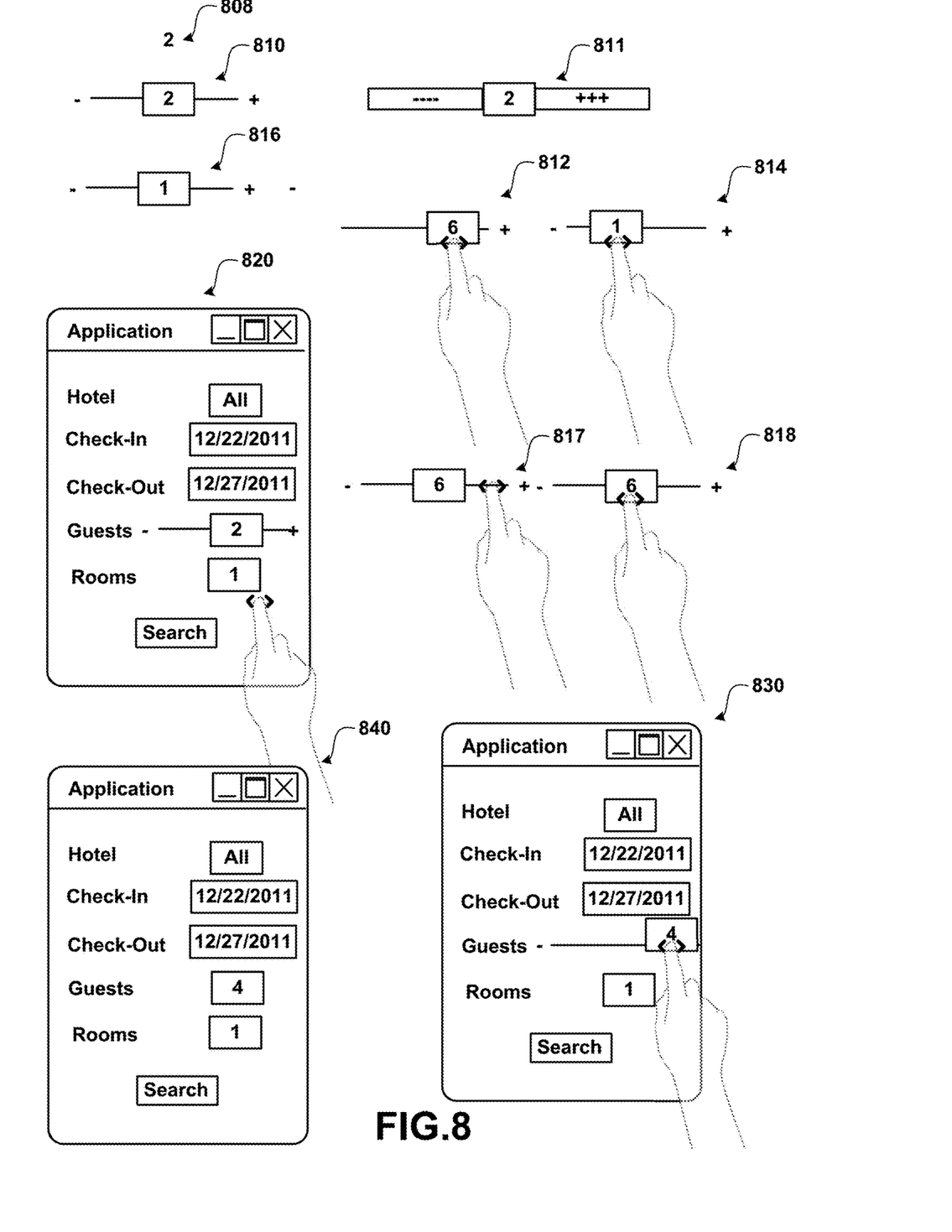
FIG. 8 shows displays for adjusting a value in place within a document using a slide UI element.

FIG. 8 shows displays for adjusting a value in place within a document using a slide UI element.

Displays 808, 810, 811, 812, 814 and 816 show a user adjusting a value in place using a slider UI element.

Display 808 shows a value 2 before being selected for editing in place.

Display 810 shows an initial display of a UI element that is displayed in response to the value 2 being selected. As illustrated, a line is placed to the left and to the right of the value to edit in place. The line may be displayed using different methods. For example, a portion of the line to the left of the number may be displayed using a first color and a portion of the line to the right of the number may be displayed using a different color. A box may be displayed (e.g. display 811) to show a slider, and the like.

Display 812 shows the user sliding the value 2 to the right such that a current value is 6. According to an embodiment, the value itself moves along the line. According to an embodiment, the initial value may remain at the initial location and a value of the currently edited value may be shown along the slider line. According to another embodiment, the value updates at the initially displayed location in response to the swipe gesture. For example, display 817 shows a user sliding their finger to the right of the number and in response to the sliding the value is updated. The value may be updated based on a distance of the gesture from the number and/or a velocity of the movement from the number. For example, the farther away/the faster the gesture the quicker the number changes. The value may stop changing in response to different actions. For example, a user may end the gesture by moving their finger off of the display or move their finger back to the initially displayed location as illustrated in display 818.

Display 814 shows the user sliding the value back to the left to a current value of 1.

Display 816 shows the value 1 as the set value in response to a user ending the swipe gesture. Ending the swipe gesture shows the last edited value appearing to "snap in" place (i.e. the position of the value returns to the initial position).

Window 820, window 830, and window 840 each show a user interface that is configured to receive selections for setting options for searching for a hotel. The user interface may be configured for other applications and receiving other values. As shown, window 820 shows an option for selecting a hotel, an option for setting a check-in date, an option for setting a check-out date, an option for setting a number of guests, an option for setting a number of rooms and a search option. In the current example, each option that sets a value may be set using a UI element as described and illustrated herein.

For example, a user could select the guests value to use a slider UI element to adjust the value for the number of guests. The UI element shown in FIGS. 4-7 could also be used. Further, a combination of the UI elements could be used together.

Window 830 shows a user sliding the value to 4. In response to releasing the value and ending the sliding gesture, the value 4 is set to the adjusted value.

The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A device-implemented method for receiving input to adjust a value in a document, comprising:
   receiving a selection of a value, the value associated with a displayed document that comprises one of a spreadsheet document, a word processing document or a presentation document;
   causing display of a slider user interface element;
   receiving input to cause adjustment to the slider user interface element to adjust the value; and
   in response to receiving the input, causing update of a display of the value to a new value.

2. The device-implemented method of claim 1, wherein causing the display of the slider user interface element comprises causing display of a line that appears to a left of the display of the value and to a right of the display of the value.

3. The device-implemented method of claim 2, wherein the input comprises a swipe gesture, and in response to the swipe gesture, the value appears to slide along the line.

4. The device-implemented method of claim 1, wherein:
   the input comprises a swipe gesture;
   the value comprises more than one part; and
   the method further comprises determining a part of the value associated with the swipe gesture and adjusting the part of the value that corresponds to the swipe gesture.

5. The device-implemented method of claim 1, wherein the input comprises a touch swipe gesture sliding on or near the display of the slider user interface element.

6. The device-implemented method of claim 1, wherein causing the display of the slider user interface element further comprises causing display of potential values adjacent the display of the value.

7. The device-implemented method of claim 6, wherein:
   the value comprises multiple parts that may be set at different levels; and
   causing the display of the potential values adjacent the display of the value comprises causing display of the potential values for at least one part of the value.

8. The device-implemented method of claim 6, wherein causing the display of the potential values comprises causing display of the potential values as an alpha blend such that a portion of the display located beneath the display of the potential values remains visible.

9. The device-implemented method of claim 1, further comprising determining a distance from the value to a current swipe position, wherein causing the update of the display of the value comprises adjusting a speed of the change of the value based on the distance.

10. The device-implemented method of claim 1, further comprising determining a type of category that is associated with the value and adjusting the value based on the determined type of category.

11. A computer-readable storage medium storing computer-executable instructions that, when executed by one or more processing devices, cause operations to be performed, comprising:
   causing display of a value in a displayed document that comprises one of a spreadsheet document, a word processing document or a presentation document;
   while the value is displayed, and in response to receiving a selection of the value in the document, causing display of a slider user interface element;
   receiving an input that selects and moves the slider user interface element from a first position to a second position to adjust the value selected in the document; and
   causing an update of the display of the value to a new value.

12. The computer-readable medium of claim 11, further comprising instructions for causing display of potential values for each part of the value at different positions on the display.

13. The computer-readable medium of claim 12, wherein causing the update of the display of the value comprises determining a part of the value associated with the input and causing update of the part of the value that corresponds to the input.

14. The computer-readable medium of claim 11, further comprising instructions for causing display of potential values as an alpha blend such that a portion of the display located beneath the display of the potential values remains visible.

15. The computer-readable medium of claim 11, further comprising instructions for determining a distance from the value to a current input position and adjusting a speed of the change of the value in response to the distance.

16. The computer-readable medium of claim 11, further comprising instructions for determining a type of category that is associated with the value by examining a cell and at least one surrounding cell near the selected value.

17. A mobile device, comprising:
   a display that is configured to receive touch input;
   a processor operably connected to the display;
   an application that includes values that are changeable; and
   a memory storing instructions, that when executed by the processor, cause the processor to perform actions comprising:
      receiving a selection of a value displayed in the application;
      in response to receiving the selection of the value, displaying a slider user interface element;
      receiving an input to cause the slider to slide in a direction to show possible values the value may be adjusted to without updating the display of the value; and
      in response to receiving the input that selects at least one of the possible values, updating the value to the at least one of the possible values.

18. The mobile device of claim 17, wherein displaying the slider user interface element comprises displaying the slider user interface element as an alpha blend such that a portion of the display located beneath the display of the user interface element remains visible.

19. The mobile device of claim 17, wherein:
   the input comprises a swipe gesture; and
   the memory stores further instructions for determining a distance from the value to a current swipe position and adjusting a speed of the change of the value based on the distance.

20. The mobile device of claim 17, further comprising instructions for examining content of the document near the value to determine the possible values to display.

21. A computing device, comprising:
   a processor;
   a memory storing instructions, that when executed by the processor, cause the processor to perform actions comprising:
      receiving a selection of a value associated with a displayed document;
      in response to receiving the selection of the value, causing display of a slider user interface element;
      receiving an input indicating an interaction with the slider user interface element to cause display of possible values the value may be adjusted to without causing an update of a display of the value; and
      in response to receiving an input that indicates a selection of at least one of the possible values, causing update of the value to the at least one of the possible values.

* * * * *